(12) United States Patent
Bamba et al.

(10) Patent No.: US 7,490,094 B2
(45) Date of Patent: Feb. 10, 2009

(54) IMPORTANCE OF SEMANTIC WEB RESOURCES AND SEMANTIC ASSOCIATIONS BETWEEN TWO RESOURCES

(75) Inventors: Bhuvan Bamba, New Delhi (IN); Sougata Mukherjea, New Delhi (IN)

(73) Assignee: International Buisness Machines Corporation, Armonk, NY (US)

( * ) Notice: Subject to any disclaimer, the term of this patent is extended or adjusted under 35 U.S.C. 154(b) by 1184 days.

(21) Appl. No.: 10/840,175

(22) Filed: May 6, 2004

(65) Prior Publication Data

US 2005/0251805 A1    Nov. 10, 2005

(51) Int. Cl.
*G06F 17/30* (2006.01)

(52) U.S. Cl. .................... 707/100; 707/10; 707/203; 707/3

(58) Field of Classification Search .................. None
See application file for complete search history.

(56) References Cited

U.S. PATENT DOCUMENTS 6,311,194 B1    10/2001    Sheth et al.

FOREIGN PATENT DOCUMENTS

WO    WO 03/042864    5/2003

OTHER PUBLICATIONS

A Özel, S Altingövde, Ö Ulusoy, G Özsoyoğlu and M Özsoyoğlu, Metadata-based Modeling of Information Resources on the Web, Journal of the American Society for Information Science and Technology, 55(2):97-110, Jan. 15, 2004.

K. Anyanwu and A. Sheth. *p*-Queries: Enabling Querying for Semantic Associations on the Semantic Web. In *Proceedings of the Twelfth International World-Wide Web Conference*, Budapest, Hungary, May 2003.

T. Berners-Lee, H. Hendler, and O. Lasilla. The Semantic Web. *Scientific American*, May 2001.

K. Bharat and M. Henzinger. Improved Algorithms for Topic Distillation in a Hyperlinked Environment. In *Proceedings of the ACM SIGIR' 98 Conference on Research and Development in Information Retrieval*, pp. 104-111, Melbourne, Australia, Aug. 1998.

A. Borodin, G.O. Roberts, J.S. Rosenthal, and P. Tsaparas. Finding Authorities and Hubs from Link Structures on the World Wide Web. In *Proceedings of the Tenth International World-Wide Web Conference*, pp. 415-429, Hong Kong, May 2001.

(Continued)

*Primary Examiner*—Charles Rones
*Assistant Examiner*—Belix M Ortiz
(74) *Attorney, Agent, or Firm*—Gibb & Rahman, LLC (57) ABSTRACT

The importance of semantic web resources is determined. Some resources are classes (of the type RDFS:Class); others are non-class resources. Non-class resources belong to one or more classes while class resources are subclasses of one or more parent classes. A subjectivity score is determined for each resource of a set of resources based on the number of Resource Description Format (RDF) triples of which the resource is the subject and predefined weights of properties of the triples. An objectivity score is determined for each resource based on the number of RDF triples of which the resource is the object and predefined weights of the properties of the triples. The importance of a class is determined from the respective subjectivity score and objectivity score, and a factor relating to the importance of the class's parents.

13 Claims, 4 Drawing Sheets

OTHER PUBLICATIONS

S. Brin and L. Page. The Anatomy of a Large-scale Hypertextual Web Search Engine. *Computer Networks and ISDN Systems. Special Issues on the Seventh International World-Wide Web Conference*, Brisbane, Australia, 30(1-7): 107-117, Apr. 1998.

S. Chakrabarti, B. Dom, D. Gibson, J. Kleinberg, P. Raghavan, and S. Rajagopalan. Automatic Resource Compilation by Analyzing Hyperlink Structure and Associated Text. *Computer Networks and ISDN Systems. Special Issue on the Seventh International World-Wide Web Conference*, Brisbane, Australia, 30(1-7):65-74, Apr. 1998.

R. Guha, R. McCool, and E. Miller. Semantic Search. In *Proceedings of the Twelfth International World-Wide Web Conference*, Budapest, Hungary, May 2003.

S. Karvounarakis, S. Alexaki, V. Christophides, D. Plexousakis, and M. Scholl. RQL: A Declarative Query Language for RDF. In *Proceedings of the Eleventh International World-Wide Web Conference*, Honolulu, Hawaii, May 2002.

V. Kashyap and A. Borgida. Representing the UMLS Semantic Network using OWL (Or "Whats in a Semantic Web Link?"). In *the Proceedings of the Second International Semantic Web Conference*, Sanibel Island, Florida, 2003.

R. Lempel and S. Moran. The Stochastic Approach for Link-structure Analysis (SALSA) and the TKC effect. In *Proceedings of the Ninth International World-Wide Web Conference*, pp. 387-401, Amsterdam, Netherlands, May 2000.

M. Sintek and S. Decker. Triple A Query, Inference and Transformation Language for the Semantic Web. In *the Proceedings of the 1st Semantic Web Conference*, Sardinia, Italy, Jun. 2002.

R. Tarjan. Fast Algorithms for Solving Path Problems. *Journal of ACM*, 28(3), Jul. 1991.

J.M. Kleinberg. Authorative Sources in a Hyperlinked Environment. In *Proceedings of the 9th ACM-SIAM Symposium on Discrete Algorithms*, May 1998.

IMPORTANCE OF SEMANTIC WEB RESOURCES AND SEMANTIC ASSOCIATIONS BETWEEN TWO RESOURCES

FIELD OF THE INVENTION

The present invention relates to Semantic Web resources, and particularly to the determination of relative importance of such resources and utilizing the importance to identify the Semantic Association between two resources.

BACKGROUND

The Semantic Web is a vision of the next generation Worldwide Web in which data is described with rich semantics thereby enabling software agents to 'understand' the data and perform complex tasks on behalf of humans. To achieve this vision, languages have been developed for specifying the meaning of concepts, relating them with custom ontologies for different domains and reasoning about the concepts. The most well-known languages are Resource Description Format (RDF) and RDF Schema (RDFS)which together provide an unique format for the description and exchange of the semantics of Web content. To realize the full potential of the Semantic Web, effective techniques for information retrieval need to be developed.

RDF provides a simple data model for describing relationships between resources in terms of named properties and their values. It describes a Semantic Web using RDF Statements which are triples of the form (Subject, Property, Object). Subjects are resources which are uniquely identified by a Uniform Resource Identifier (URI). Objects can be resources or literals. Properties are first class objects in the model that define binary relations between two resources or between a resource and a literal.

RDF Schema (RDFS) makes the model more powerful by allowing new resources to be specializations of already defined resources. RDFS Classes are resources denoting a set of resources, by means of the property RDF:type (instances have property RDF:type valued by the class). All resources have by definition the property RDF:type valued by RDF:Resource. Moreover, all properties have RDF:type valued by RDF:Property and classes are of the type RDFS:Class.

Two important properties defined in RDFS are subClass of and subPropertyOf. Two other important concepts are domain and range which apply to properties and must be valued by classes. They restrict the set of resources that may have a given property (the property's domain) and the set of valid values for a property (its range). A property may have as many values for domain as needed, but no more than one value for range. For a triple to be valid, the type of the object must be the range class and the type of the subject must be one of the domain classes. RDFS allows inference of new triples based on several simple rules.

The development of effective information retrieval techniques for the Semantic Web has become an important research problem. One approach is query languages that use a SQL-like declarative syntax to query a Semantic Web as a set of RDF triples. Inference is incorporated as part of query answering. However, these languages are not able to determine complex relationships between two resources.

To address this, Anyanwu and Sheth proposed rho-queries for determining the Semantic Association among the Semantic Web resources [K. Anyanwu and A. Sheth, "rho-Queries: Enabling Querying for Semantic Associations on the Semantic Web"; *Proceedings of the Twelfth International World-Wide Web Conference*, May 2003]. However, no effective implementation has been proposed.

A technique of finding the important pages in a WWW collection has been developed by Kleinberg [J. M. Kelinberg, "Authorative Sources in a Hyperlinked Environment", *Proceedings of the $9^{th}$ ACM-SIAM Symposium on Discrete Algorithms*, May 1988] who defined two types of scores for Web pages which pertain to a certain topic: authority and hub scores. Documents with high Authority scores are authorities on a topic and therefore have many links pointing to them. On the other hand, documents with high hub scores are resource lists—they do not directly contain information about the topic, but rather point to many authoritative sites. Transitively, a document that points to many good authorities is an even better hub, and similarly a document pointed to by many good hubs is an even better authority.

SUMMARY

The importance of semantic web resources is determined. Some resources are classes (of the type RDFS:Class); others are non-class resources. Non-class resources belong to one or more classes while class resources are subclasses of one or more classes. A subjectivity score is determined for each resource of a set of resources based on the number of Resource Description Format (RDF) triples of which the resource is the subject and predefined weights of the properties of the triples. An objectivity score is determined for each resource based on the number of RDF triples of which the resource is the object and predefined weights of the properties of the triples. The importance of a class resource is determined from the respective subjectivity score and objectivity score, and a factor relating to the importance of the class's parents. (Parents are the classes of which the particular resource is a subclass of). The importance of a non-class resource is determined from the respective subjectivity score and objectivity score, and a factor relating to the importance of the classes to which the resource belongs.

The semantic web is represented as a directed graph and the resources are nodes in the graph. The properties are links between the nodes. The subjectivity and objectivity scores are determined on the basis of the number of incoming and outgoing links for each node and the predefined weight of each link.

To determine the relationship between two semantic web resources, one can determine the path association or join association between the resources. Path association between semantic web resources is determined by the existence of direct paths between respective nodes in the directed graph. Since there may be a large number of such paths, to prevent information overload for the user, one can iteratively filter the directed graph by the importance of the resources representing the nodes to determine the paths in order of importance of the vertices in the path.

Join association between two semantic web resources is determined by the existence of paths from the respective nodes in the directed graph to a common end node or by the existence of paths to the respective nodes in the directed graph from a common start node. Since there may be a large number of such paths, to prevent information overload for the user, one can iteratively filter the directed graph by the importance of the resources representing the nodes to determine the paths in order of importance of the vertices in the path.

DETAILED DESCRIPTION

Figure 1:
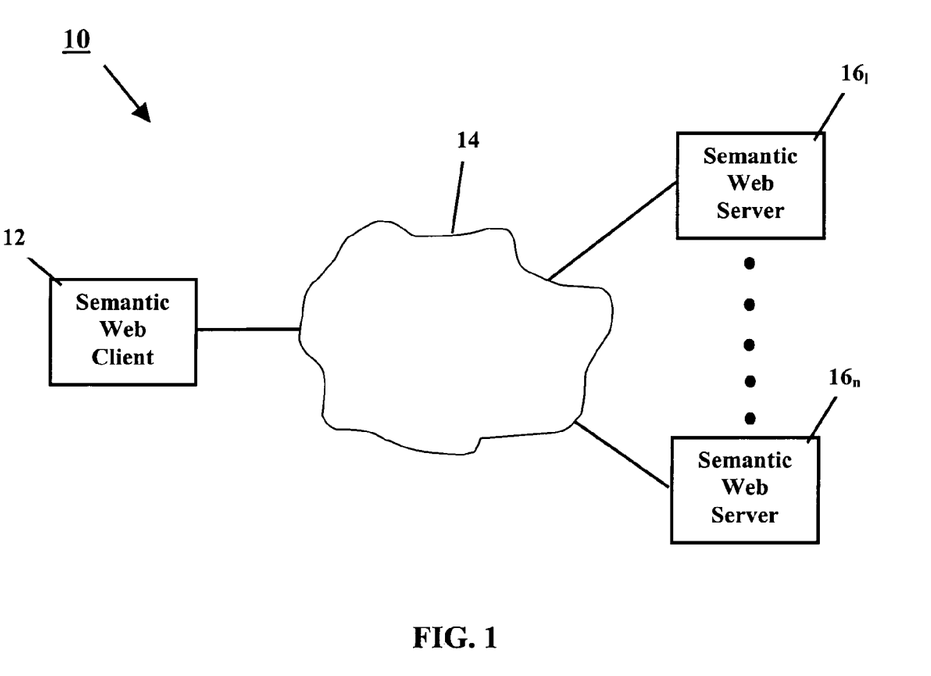
FIG. 1 is a schematic representation of a client server architecture for a semantic web.

FIG. 1 is a simplified schematic block diagram of a semantic web system 10. A semantic web client 12 runs a program that provides access to a public network 14 by which it can retrieve information from a plurality of Web servers $16_1 \ldots 16_n$. These servers contain the data for the Semantic Web as well as the software to retrieve information from the Semantic Web.

The specific example given is a Biomedical Semantic Web. It will be understood that the invention is not limited to such applications.

System Overview

An example Semantic Web has been built for the Unified Medical Language System (UMLS) [http://umlsks.nlm.nih.gov]. UMLS is a consolidated repository of medical terms and their relationships, spread across multiple languages and disciplines (chemistry, biology, etc). UMLS includes a Semantic Network which has 135 semantic classes like Gene or Genome and Amino Acid, Peptide, or Protein. The semantic classes are linked by a set of 54 semantic relationships (like prevents, causes). In addition, there are biological concepts each of which are associated with one or more semantic classes. For example, the concept blood cancer has the semantic class Neoplastic Process.

The Semantic Web for UMLS was built using Jena 2.0, an open source Java framework for building Semantic Web applications [http://jena.sourceforge.net and http://hpl.hp.com/semweb/jena2.htm]. RDFS classes are created for all the Semantic Network classes and RDF Properties for all Semantic Network relationships except isa. A RDF statement is created to represent each relationship among the classes. The isa relationship is represented by RDFS:subClassOf relationship if it is between classes and RDFS:subPropertyOf relationship if it is between properties. The biological concepts are represented as RDF resources. They are named by their UMLS concept ids and the various concepts names were stored as RDFS labels.

Graphical Representation

To fully capture the richness of a Semantic Web, a graphical representation of the information space is required.

Firstly, define a Semantic Web as (C, P, NC) where C are the classes, P are the properties and NC are the normal resources (neither classes nor properties) that are defined for the Semantic Web. In creating the graph, classes and properties that are not defined in the local namespace are ignored (for example RDF:Resource, RDFS:subClassOf, etc.) The information space is presented using two graphs: isaGraph and propertyGraph.

isaGraph

The isaGraph is a directed graph whose vertices represent C, the classes of the Semantic Web. For all triples (c1 RDFS:subClassOf c2) defined in the Semantic Web, an edge (c2,c1) is created in the isaGraph. Thus, the isaGraph represents the subClassOf relation of the Semantic Web. Triples formed by inference while creating this graph are ignored. Note that the subClassOf relation cannot be represented as a tree, since a class can have more than one parent.

propertyGraph

Let $P_r$ be a subset of P, containing only properties whose objects are resources. Let R be a subset of (C ∪ NC) such that:
$\forall (r \in R) \exists (p_r \in P_r)$ such that r is a subject or object of a triple whose predicate is $p_r$, or r is the domain or range of $p_r$.

The propertyGraph is a directed graph representing the properties defined in the local namespace. Its vertex set is R, the resources that are related to other resources by local properties. An edge $(r_1, r_2)$ exists in the propertyGraph if any one of the conditions hold:

A triple $(r_1, p_r, r_2)$ exists in the Semantic Web for any $(p_r \in P_r)$. In other words, an edge is created between two resources in the propertyGraph if they are the subject and object of a triple.

$(p_r, RDFS:domain, r_1)$ and $(p_r, RDFS:range, r_2)$ exist in the Semantic Web for any $(p_r \in Pr)$. In other words, an edge is created between two resources (classes) in the property graph if they are the domain and range of a local property (and are thus related).

Triples formed by inference are ignored while creating this graph.

Semantic Web Resource Importance

Since many queries on the Semantic Web will result in a large number of results, effective techniques of sorting the results are required. Ranking using information retrieval techniques like term frequency may not always provide the most intuitive results for the user. It may be better to rank based on the importance of the Semantic Web resources. The technique for calculating the importance is now explained.

Subjectivity and Objectivity Scores

A resource that has relationships with many other resources in the Semantic Web can be considered to be important since it is an important aspect of the overall semantics; the meaning of many other resources of the Semantic Web have to be defined with respect to that resource. It is immaterial whether the resource is the subject or object of a RDF triple; it should be considered important if it is a part of many RDF triples. In the context of the propertyGraph, vertices that have a high in-degree or out-degree should be considered important.

Kleinberg's hub and authority scores, discussed before, gives a good indication about the connectivity of nodes in the WWW graph. It not only considers the number of links to and from a node but also the importance of the linked nodes. If a node is pointed to by a node with high hub score, its authority score is increased. Similarly, if a node points to a node with high authority score, its hub score is increased. Therefore, we calculate scores similar to the hub and authority scores of the propertyGraph to get an estimate of the importance of the resources in the Semantic Web. These scores are called Subjectivity and Objectivity scores corresponding to hub and authority scores. A node with high subjectivity/objectivity score is the subject/object of many RDF triples.

In the WWW all links can be considered to be equally important. On the other hand in a Semantic Web all properties that represent the links in the Property Graph may not be equally important. Therefore, Kleinberg's algorithm has been modified to calculate the subjectivity and objectivity scores as follows:

1. Let N be the set of nodes and E be the set of edges in the propertyGraph.
2. For every resource n in N, let S[n] be its subjectivity score and O[n] be its objectivity score.
3. Initialize S[n] and O[n] to 1 for all r in R.
4. While the vectors S and O have not converged:

(a) For all n in N, $O[n]=\Sigma_{(n1,n) \in E} S[n1]*wt$ where wt is the predefined importance of the link (property)
(b) For all n in N, $S[n]=\Sigma_{(n,n1) \in E} O[n1]*wt$ where wt is the predefined importance of the link (property)

Our modification is that while determining the subjectivity and objectivity scores of a vertex we multiply the scores of the adjacent vertex by the weights of the corresponding link. This will ensure that the scores of the resources are not influenced by unimportant properties.

Determining Class Importance

The importance of a Semantic Web class is determined by how well it is connected to other resources. Obviously, this will be dependent on its subjectivity and objectivity scores. If $c_1$ is a subclass of $c_2$, all the properties of $c_2$ should be inherited by $c_1$.

Therefore, the importance of a class should also be influenced by its parents. Because of the transitive property of the subClassOf relation, the importance of a class should actually be dependent on all its ancestors. However, a class should only marginally influence a distant descendent much lower in the isa hierarchy.

Based on these beliefs, the importance of a class is calculated as:

1. Let parent Wt, sub Wt, objWt be constants that determine the importance attached to the parents, subjectivity and objectivity scores while calculating the importance.

parent$Wt$+sub$Wt$+obj$Wt$=1.0.

2. Let N be the set of nodes and E be the set of edges in the isaGraph.
3. For every resource n in N, let S[n], O[n], PI[n] and I[n] be its subjectivity, objectivity, parent importance and importance scores respectively.
4. $PI[n]=\Sigma_{(n1, n) \in E} I[n1]/indegree(n)$
5. $I[n]=PI[n]*parentWt+S[n]*subjWt+O[n]*objWt$ Thus, the importance of a class is determined by its subjectivity and objectivity scores and the importance of its parents. If ($c_1$, subClassOf, $c_2$) and ($c_2$, subClassOf, $c_3$), the I($c_2$) will be influenced by I($c_3$). Since I($c_1$) is influenced by I($c_2$), it is also influenced by I($c_3$). However, the influence of an ancestor on a node is inversely proportional to its distance from the node.

Determining Resource Importance

We believe that the importance of a Semantic Web non-class resource should be determined by how well it is connected to other resources. We also believe that it should be influenced by the importance of the classes it belongs to. Therefore we calculate the importance of a non-class resource as follows:

1. Let classWt, subWt, objWt be constants that determine the importance attached to the classes, subjectivity and objectivity scores while calculating the importance.

class$Wt$+sub$Wt$+obj$Wt$=1.0.

2. Let NC be the non-class resources in the Semantic Web.
3. For every resource n in NC, let S[n], O[n], CI[n] and I[n] be its subjectivity, objectivity, class importance and importance scores respectively.
4. Let noClass[n] be the number of triples in the Semantic Web where n is the subject and RDF:type is the predicate.
5. $CI[n]=\Sigma_{(n,RDF:type,c) \in SemanticWeb} I[c]/noClass[n]$
6. $I[n]=CI[n]*classWt+S[n]*subWt+O[n]*objWt$ Thus the importance of a resource r is determined by its subjectivity and objectivity scores as well as the importance of all classes for which the triple (r, RDF:type, c) is defined explicitly in the Semantic Web. Note that the subWt and objWt constants for calculating the Class and Resource importance are different.

Importance Scores for the Example Semantic Web

Table 1 shows the scores during Importance calculation for several resources and classes of the UMLS Semantic Web. It shows the name of the resource, its type (Class/Resource), subjectivity and objectivity scores, the parent or class importance (depending on whether it is a Class or a non-Class resource) and its total importance.

TABLE 1

| Resource | Type | Subjectivity Score | Objectivity Score | Parent/Class Score | Importance |
|---|---|---|---|---|---|
| Pharmacologic_Substance | Class | 1.0 | 0.081 | 0.048 | 0.347 |
| Injury_or_Poisoning | Class | 0.391 | 1.0 | 0.046 | 0.531 |
| Pathologic_Function | Class | 0.937 | 0.715 | 0.213 | 0.631 |
| Disease_or_Syndrome | Class | 0.045 | 0.055 | 0.631 | 0.225 |
| C00043666.xml | Resource | 0.0 | 0.0 | 0.631 | 0.252 |

For the calculation of Class importance the values of the constants were 0.3, 0.3 and 0.4 for parentWt, subWt and objWt respectively. For Resource importance the values were 0.4, 0.25 and 0.35 for classWt, subWt and objWt respectively. The weights of all links (properties) are 1.0.

The resource representing the Semantic Network class Injury_or_Poisoning has the maximum objectivity score while Pharmacologic_Substance has the maximum subjectivity score. The class Pathologic_Function has the maximum value of overall importance. Therefore, its children like Disease_or_Syndrome has the maximum parent importance score. The non Class resources of the UMLS Semantic Web are the biological concepts. No relationships have been defined for these concepts in the current Semantic Web. Therefore their subjectivity and objectivity scores are zero and their overall importance is determined by the classes they belongs to. Therefore, resources of type Pathologic_Function (for example C0004366.xml which represents the concept autoimmune response) has the maximum importance among the UMLS biological concepts.

Semantic Associations

On occasions the user would like to determine the relationship between any two resources in the Semantic Web without any specification of the type of the properties or the length of the path. In order to determine any arbitrary relationships among resources, the idea of Semantic Association has been developed. Techniques to efficiently determine Semantic Association are now disclosed.

DEFINITIONS

Figure 2:
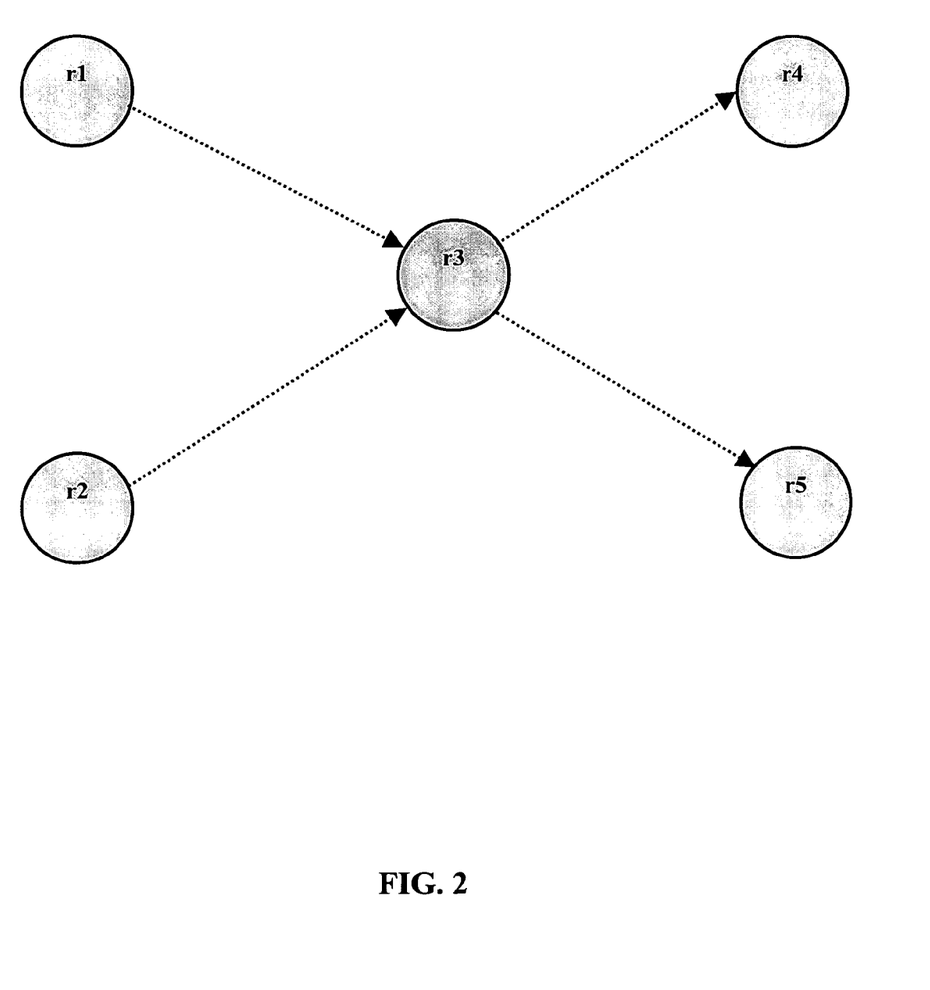
FIG. 2 shows an example property graph.

Definitions related to Semantic Associations based on the propertyGraph are firstly presented. For the definitions, let FIG. 2 represent a propertyGraph. Several resources are shown with the dashed arrows representing paths between the resources.

Two resources $r_1$ and $r_2$ are p-path-associated if there is a direct path from $r_1$ to $r_2$ in propertyGraph. For example, in the example graph shown in FIG. 2, resources r1 and r5 and r2 and r4 are p-path-associated.

Two directed paths in the propertyGraph are said to be joined if they have at least one vertex common. The common vertex is called the join node. For example the directed paths from r1 to r5 and r2 to r4 are joined with the common vertex r3. Two resources $r_1$ and $r_2$ are p-join-associated if there are joined paths $p_1$ and $p_2$ and either of these two conditions are satisfied:

1. $r_1$ is the origin of $p_1$ and $r_2$ is the origin of $p_2$
2. $r_1$ is the terminus of $p_1$ and $r_2$ is the terminus of $p_2$ Thus in FIG. 2 r1 and r2 and r4 and r5 are p-join-associated.

Implementation p-path-associated

To determine whether two resources are p-path-associated, a linear time algorithm can be used to determine whether there is a direct path between the two vertices in the propertyGraph. However, for this to be really useful, the user also needs to know how the two resources are related, that is, all the paths between the resources need to be determined. Just showing the shortest path may not be enough. Although fast algorithms exist for finding all paths between two vertices, for any real-world Semantic Web there will be a large number of paths between most resources. One solution is to show paths whose length is less than some arbitrary number n. However, for a well connected propertyGraph, there may be a large number of such paths unless n is very small. While very small paths may not be very important, showing all sufficiently large paths may lead to information overload.

Now disclosed is a technique that selectively shows the paths between the resources of interest based on the importance of the vertices in the path. The procedure p_path_associated (r1, r2, N) determines the N most important paths between the resources r1 and r2 in the propertyGraph as follows:

Let th be the current threshold and n be the number of paths found so far. Initialize th to a fairly large value less than one ($\simeq 0.5$) and n to 0.

while (n<N) && (th>=0)

Filter the property graph to include only r1 and r2 and resources whose importance is greater than th.

Determine the directed paths from r1 to r2 as well as r2 to r1 in the filtered graph.

Increment n by the number of paths found and decrement th by a small value ($\simeq 0.005$).

The procedure can be initially called with a small value of N to identify the most important paths. If more paths are desired it can be subsequently called with a larger value of N. Thus the algorithm allows the user to see the important paths between two resources and still avoid information overload.

TABLE 2

| Path Length | Threshold | | | | |
|---|---|---|---|---|---|
| | 0.0 | 0.005 | 0.01 | 0.03 | 0.05 |
| 1 | 2 | 2 | 2 | 2 | 2 |
| 2 | 3 | 3 | 3 | 3 | 2 |
| 3 | 6 | 6 | 6 | 4 | 3 |
| 4 | 20 | 20 | 20 | 12 | 3 |
| 5 | 93 | 91 | 87 | 68 | 10 |

Table 2 shows the number of paths of different length identified between the resources Biologically_Active_Substance and Biologic_Function in the UMLS Semantic Web for different values of threshold.

p_join_associated

The p_join_associated(r1, r2, N) determines the N most important join nodes forming join associations between the resources r1 and r2 in the propertyGraph as follows:

Let th be the current threshold and n be the number of paths found so far. Initialize th to a fairly large value less than one ($\simeq 0.5$) and n to 0.

while (n<N) && (th>=0)

Let $S_{end}$ be a set of all pairs of paths from r1 and r2 which have a common end vertex. Let vector $C_{end}$ contain the common end vertices of these paths.

Similarly, determine the set $S_{start}$ that contains all pairs of paths to r1 and r2 from a common start vertex and the vector $C_{start}$ containing the common start vertices of these paths.

Increment n by the join nodes found in $C_{end}$ and $C_{start}$.

Decrement th by a small value ($\simeq 0.005$)

The procedure finds paths from/to r1 and r2 that end/start in a common (join) node. These paths represent the join associations.

Visualizing the Semantic Associations

Figure 3:
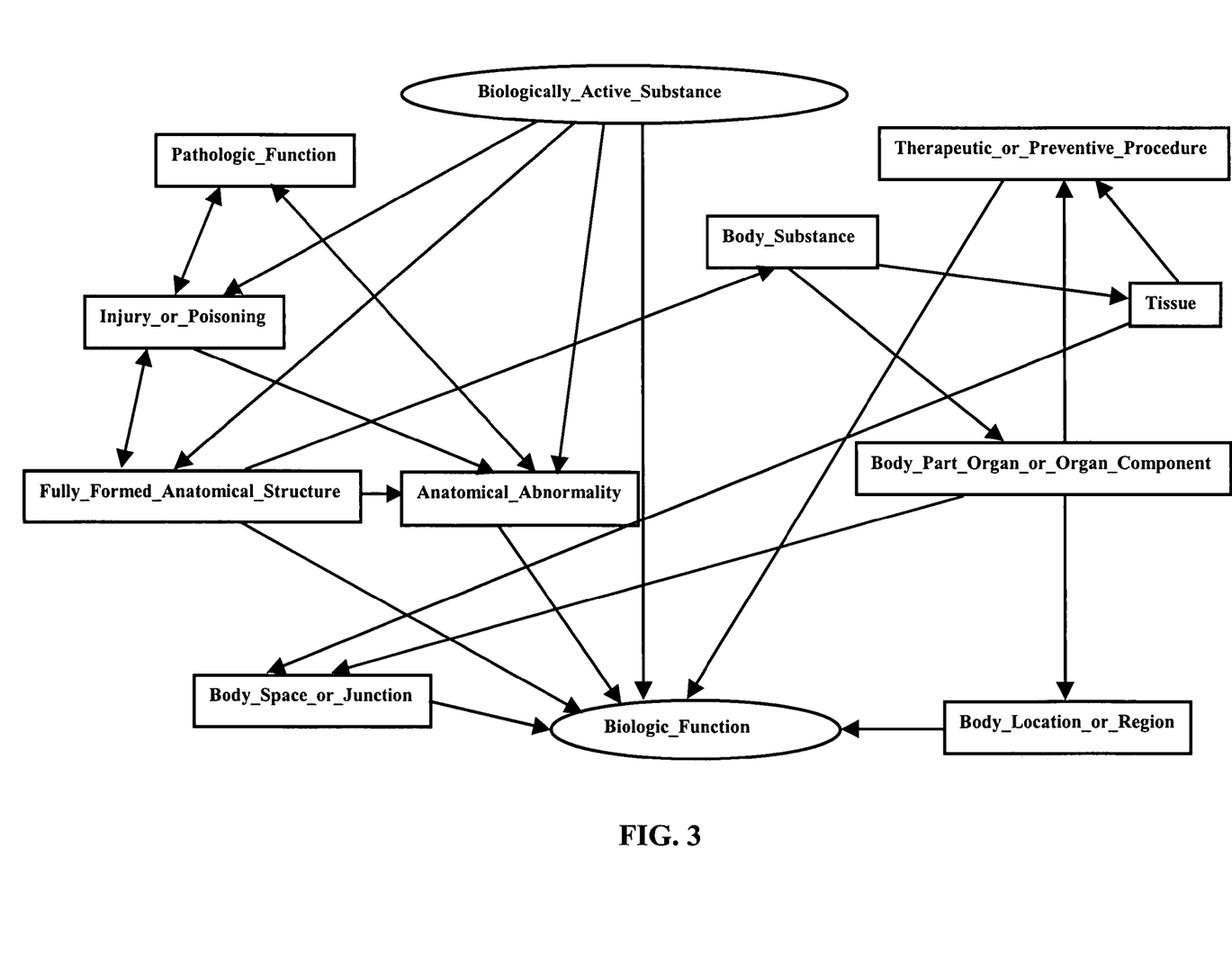
FIG. 3 shows a visualization of paths in a Semantic Web example.

The result of finding the Semantic Associations between two resources is a list of paths in the property Graph. Showing these paths textually may not be very intuitive for the users. Therefore, a Swing-based Java WebStart application is utilized to visualize the different types of associations between Semantic Web resources. For example, FIG. 3 shows the p_path_associated directed paths between Biologically_Active_Substance and Biologic_Function for a threshold of 0.05 in the UMLS Semantic Web. Note that to prevent clutter, the labels of the edges are only shown by clicking on them. The interface allows the user to change the value of threshold to see a different number of paths.

Computer Hardware

Figure 4:
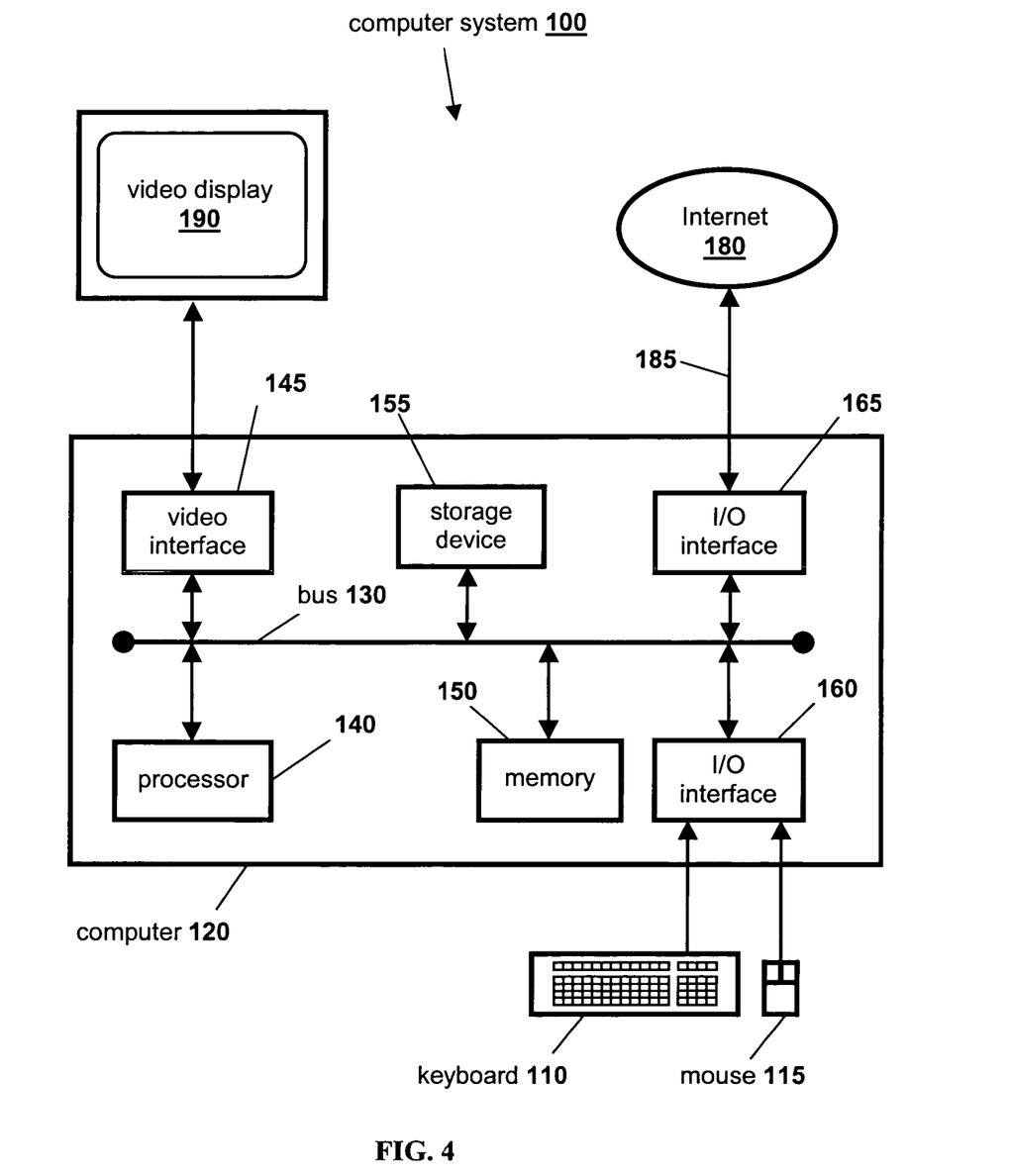
FIG. 4 is a schematic representation of a computer system suitable for performing the techniques described herein.

FIG. 4 is a schematic representation of a computer system 100 of a type that is suitable for executing computer software for determining the importance of Semantic Web resources. Computer software executes under a suitable operating system installed on the computer system 100, and may be thought of as comprising various software code means for achieving particular steps.

The components of the computer system 100 include a computer 120, a keyboard 110 and mouse 115, and a video display 190. The computer 120 includes a processor 140, a memory 150, input/output (I/O) interfaces 160, 165, a video interface 145, and a storage device 155.

The processor 140 is a central processing unit (CPU) that executes the operating system and the computer software executing under the operating system. The memory 150 includes random access memory (RAM) and read-only memory (ROM), and is used under direction of the processor 140.

The video interface 145 is connected to video display 190 and provides video signals for display on the video display 190. User input to operate the computer 120 is provided from the keyboard 110 and mouse 115. The storage device 155 can include a disk drive or any other suitable storage medium.

Each of the components of the computer 120 is connected to an internal bus 130 that includes data, address, and control buses, to allow components of the computer 120 to communicate with each other via the bus 130.

The computer system 100 can be connected to one or more other similar computers via a input/output (I/O) interface 165 using a communication channel 185 to a network, represented as the Internet 180.

The computer software may be recorded on a portable storage medium, in which case, the computer software program is accessed by the computer system 100 from the storage device 155. Alternatively, the computer software can be accessed directly from the Internet 180 by the computer 120.

In either case, a user can interact with the computer system 100 using the keyboard 110 and mouse 115 to operate the programmed computer software executing on the computer 120.

Other configurations or types of computer systems can be equally well used to execute computer software that assists in implementing the techniques described herein.

Conclusion

Various alterations and modifications can be made to the techniques and arrangements described herein, as would be apparent to one skilled in the relevant art.

We claim:

1. A computer implemented method for determining importance of semantic web resources, said resources being either a class or a non-class resource, and each non-class resource belonging to one or more classes, and each class resource being a subclass of one or more parent classes, the method comprising:

determining a subjectivity score for each resource of a set of resources based on a number of Resource Description Format (RDF) triples of which said resource is a subject of and predefined weights of the properties of said triples;

determining an objectivity score for each said resource based on the number of RDF triples of which the resource is an object of and predefined weights of properties of the triples;

determining an importance of a class resource from said subjectivity score and objectivity score, and a factor relating to an importance of the parents of said classes; and determining an importance of a non-class resource from said subjectivity score and objectivity score, and a factor relating to an importance of the classes to which the resource belongs.

2. The method of claim 1, wherein said semantic web resources are represented as a first directed graph and resources are nodes in the graph, and properties of said semantic web resources are links between nodes, and further wherein said subjectivity score and said objectivity score are determined based on a number of incoming and outgoing links for each node and a predefined weight of each link.

3. The method of claim 2, wherein said semantic web resources are represented as a second directed graph in which classes are nodes, and class relationships are edges in the second graph, and said importance factor of parents of said class is determined in inverse proportion to a distance between nodes.

4. The method of claim 2, further comprising:

determining path associations between semantic web resources by an existence of direct paths between respective nodes in said first directed graph; and iteratively filtering said first directed graph by an importance of resources representing said nodes to determine paths in order of importance of vertices in the path.

5. The method of claim 2, further comprising:

determining join associations between two semantic web resources by an existence of paths from respective nodes in the directed graph to a common end node or by an existence of paths to the respective nodes in the directed graph from a common start node; and iteratively filtering said first directed graph by an importance of resources representing said nodes to determine paths in order of importance of vertices in the path.

6. A computer program product for determining importance of semantic web resources, said resources being either a class or a non-class resource, and each non-class resource belonging to one or more classes, and each class resource being a subclass of one or more parent classes, comprising a computer program on a storage medium, said computer program including:

code means for determining a subjectivity score for each resource of a set of resources based on a number of Resource Description Format (RDF) triples of which said resource is a subject of and predefined weights of the properties of said triples;

code means for determining an objectivity score for each said resource based on the number of RDF triples of which the resource is an object of and predefined weights of properties of the triples;

code means for determining an importance of a class resource from said subjectivity score and objectivity score, and a factor relating to an importance of the parents of said classes; and code means for determining an importance of a non-class resource from said subjectivity score and objectivity score, and a factor relating to an importance of the classes to which the resource belongs.

7. A computer implemented method for determining path associations between two semantic web resources, said resources being either a class or a non-class resource, and each non-class resource belonging to one or more classes, and each class resource being a subclass of one or more parent classes, said semantic web being represented as a first directed graph and resources are nodes in the graph, and properties of said semantic web are links between nodes, said method comprising:

determining a subjectivity score for each resource of a set of resources based on predefined weight of each said link;

determining an objectivity score for each said resource based on the predefined weight of each said link;

determining an importance of a class resource from said subjectivity score and objectivity score, and a factor relating to an importance of parents of said classes;

determining importance of a non-class resource from said subjectivity score and objectivity score, and a factor relating to an importance of the classes to which the resource belongs;

determining path associations between semantic web resources by an existence of direct paths between respective nodes in said first directed graph; and iteratively filtering the said first directed graph by an importance of the nodes to determine paths in order of importance of vertices in the path.

8. A computer program product for determining path associations between two semantic web resources, said resources being either a class or a non-class resource, and each non-class resource belonging to one or more classes, and each class resource being a subclass of one or more parent classes, said semantic web being represented as a first directed graph and resources are nodes in the graph, and properties of said semantic web are links between nodes, comprising a computer program on a storage medium, said computer program including:

code means for determining a subjectivity score for each resource of a set of resources based on a predefined weight of each said link;

code means for determining an objectivity score for each said resource based on the predefined weight of each said link;

code means for determining an importance of a class resource from said subjectivity score and objectivity score, and a factor relating to an importance of parents of said classes;

code means for determining importance of a non-class resource from said subjectivity score and objectivity score, and a factor relating to an importance of the classes to which the resource belongs;

code means for determining path associations between semantic web resources by an existence of direct paths between respective nodes in said first directed graph; and code means for iteratively filtering the said first directed graph by an importance of the nodes to determine paths in order of importance of vertices in the path.

9. A computer implemented method for determining join associations between two semantic web resources, said resources being either a class or a non-class resource, and each non-class resource belonging to one or more classes, and each class resource being a subclass of one or more parent classes, said semantic web being represented as a first directed graph and resources are nodes in the graph, and properties of said semantic web are links between nodes, said method comprising:

determining a subjectivity score for each resource of a set of resources based on a predefined weight of each said link;

determining an objectivity score for each said resource based on the predefined weight of each said link;

determining an importance of a class resource from said subjectivity score and objectivity score, and a factor relating to an importance of parents of said classes;

determining an importance of a non-class resource from said subjectivity score and objectivity score, and a factor relating to an importance of the classes to which the resource belongs;

determining join associations between two semantic web by an existence of paths from the nodes in the directed graph to a common end node or by an existence of paths to the nodes in the directed graph from a common start node; and iteratively filtering said first directed graph by an importance of a resource representing said nodes to determine paths in order of importance of vertices in the path.

10. A computer program product for determining join associations between two semantic web resources, said resources being either a class or a non-class resource, and each non-class resource belonging to one or more classes, and each class resource being a subclass of one or more parent classes, said semantic web being represented as a first directed graph and resources are nodes in the graph, and properties of said semantic web are links between nodes, comprising a computer program on a storage medium, said computer program including:

code means for determining a subjectivity score for each resource of a set of resources based on a predefined weight of each said link;

code means for determining an objectivity score for each said resource based on the predefined weight of each said link;

code means for determining an importance of a class resource from said subjectivity score and objectivity score, and a factor relating to an importance of parents of said classes;

code means for determining an importance of a non-class resource from said subjectivity score and objectivity score, and a factor relating to an importance of the classes to which the resource belongs;

code means for determining join associations between two semantic web resources by an existence of paths from the nodes in the directed graph to a common end node or by an existence of paths to the nodes in the directed graph from a common start node; and code means for iteratively filtering said first directed graph by an importance of the nodes to determine paths in order of importance of vertices in the path.

11. A system for determining importance of semantic web resources, said being either a class or a non-class resource, and each non-class resource belonging to one or more classes, and each class resource being a subclass of one or more parent classes, the system comprising:

processor configured to determining a subjectivity score for each resource of a set of resources based on a number of Resource Description Format (RDF) triples of which said resource is a subject of and predefined weights of the properties of said triples;

processor configured to determining an objectivity score for each said resource based on the number of RDF triples of which the resource is an object of and predefined weights of properties of the triples;

processor configured to determining an importance of a class resource from said subjectivity score and objectivity score, and a factor relating to an importance of the parents of said classes; and processor configured to determining an importance of a non-class resource from said subjectivity score and objectivity score, and a factor relating to an importance of the classes to which the resource belongs.

12. A system for determining path associations between two semantic web resources, said resources being either a class or a non-class resource, and each non-class resource belonging to one or more classes, and each class resource being a subclass of one or more parent classes, said semantic web being represented as a first directed graph and resources are nodes in the graph, and properties of said semantic web are links between nodes, said system comprising:

processor configured determining a subjectivity score for each resource of a set of resources based on a predefined weight of each said link;

processor configured to determining an objectivity score for each said resource based on the predefined weight of each said link;

processor configured determining an importance of a class resource from said subjectivity score and objectivity score, and a factor relating to an importance of parents of said classes;

processor configured to determining importance of a non-class resource from said subjectivity score and objectivity score, and a factor relating to an importance of the classes to which the resource belongs;

processor configured to determining path associations between two semantic web resources by an existence of direct paths between respective nodes in said first directed graph; and processor configured to iteratively filtering said first directed graph by an importance of the nodes to determine paths in order of importance of vertices in the path.

13. A system for determining join associations between two semantic web resources, said resources being either a class or a non-class resource, and each non-class resource belonging to one or more classes, and each class resource being a subclass of one or more parent classes, said semantic web being represented as a first directed graph and resources are nodes in the graph, and properties of said semantic web are links between nodes, said system comprising:

processor configured to determining a subjectivity score for each resource of a set of resources based on a predefined weight of each said link;

processor configured to determining an objectivity score for each said resource based on the predefined weight of each said link;

processor configured to determining an importance of a class resource from said subjectivity score and objectivity score, and a factor relating to an importance of parents of said classes;

processor configured to determining an importance of a non-class resource from said subjectivity score and objectivity score, and a factor relating to an importance of the classes to which the resource belongs;

processor configured to determining join associations between two semantic web by an existence of paths from the nodes in the directed graph to a common end node or by an existence of paths to the nodes in the directed graph from a common start node; and processor configured to iteratively filtering the said first directed graph by an importance of a resource representing said nodes to determine paths in order of importance of vertices in the path.

* * * * *